(12) United States Patent
Haruki

(10) Patent No.: US 11,181,953 B2
(45) Date of Patent: Nov. 23, 2021

(54) DISPLAY DEVICE

(71) Applicant: ALPINE ELECTRONICS, INC., Tokyo (JP)

(72) Inventor: Toshio Haruki, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 17/091,264

(22) Filed: Nov. 6, 2020

(65) Prior Publication Data

US 2021/0173452 A1  Jun. 10, 2021

(30) Foreign Application Priority Data

Dec. 10, 2019 (JP) .............................. JP2019-222957

(51) Int. Cl.
   *G06F 1/16* (2006.01)
   *G06F 1/18* (2006.01)
(52) U.S. Cl.
   CPC ............ *G06F 1/181* (2013.01); *G06F 1/1607* (2013.01)
(58) Field of Classification Search
   CPC .... G06F 1/1626; G06F 1/1633; G06F 1/1656; B60R 11/0229; B60R 11/0235
   See application file for complete search history.

(56) References Cited

U.S. PATENT DOCUMENTS

| | | | | |
|---|---|---|---|---|
| 9,753,536 B2 * | 9/2017 | Arai | ....................... | G06F 1/1643 |
| 10,681,830 B1 * | 6/2020 | Goodenough | ........ | G06F 1/1637 |
| 2005/0057703 A1 | 3/2005 | Tsubokura et al. | | |
| 2011/0279948 A1 * | 11/2011 | Morita | .................. | H01Q 1/2266 361/679.01 |
| 2013/0335210 A1 * | 12/2013 | Arai | ...................... | G06F 1/1643 340/407.2 |
| 2014/0233203 A1 | 8/2014 | Ohtomo | | |
| 2016/0216729 A1 | 7/2016 | Ohtomo | | |
| 2019/0272058 A1 | 9/2019 | Noma | | |
| 2020/0137911 A1 * | 4/2020 | Kim | ....................... | G06F 1/1658 |

FOREIGN PATENT DOCUMENTS

| | | |
|---|---|---|
| JP | 2014-186317 | 10/2014 |
| JP | 2016-139126 | 8/2016 |

OTHER PUBLICATIONS

Extended European Search Report for 20211139.9 dated Apr. 15, 2021, 6 pgs.

* cited by examiner

*Primary Examiner* — Adrian S Wilson
(74) *Attorney, Agent, or Firm* — Crowell & Moring LLP

(57) ABSTRACT

A display device has a first elastic member and a second elastic member between an outer support member and an extension portion outside an image display area of a front panel. The second elastic member is disposed at the position closest to an operation portion provided on the front panel in three directions. An elastic member pressing area is provided on a lower support plate of the outer support member. The second elastic member has a high compression ratio in the front-back direction, so the second elastic member acts as a pressure resistive portion. When the front panel is pressed with a finger in the operation portion, the strain of the front panel can be suppressed to a minimum due to a pressure resistive force.

21 Claims, 8 Drawing Sheets

DISPLAY DEVICE

RELATED APPLICATION

The present application claims priority to Japanese Patent Application Number 2019-222957, filed Dec. 10, 2019, the entirety of which is hereby incorporated by reference.

BACKGROUND OF THE INVENTION

1. Field of the Invention

The present invention relates to a display device structured so that a front panel to which a display panel is fixed is supported in a support area by a support member with an elastic member intervening between the front panel and the support member.

2. Description of the Related Art

Inventions related to display devices are described in Japanese Unexamined Patent Application Publication Nos. 2014-186317 and 2016-139126.

With the display device described in Japanese Unexamined Patent Application Publication No. 2014-186317, a frame is provided in front of the four outer edges of a liquid crystal panel. Front elastic bodies are provided between the display panel and the back surface of the frame, and a back elastic body is provided between a panel holder and the back surface of the display panel. In a first embodiment, at each of the upper edge and lower edge of the display panel, front elastic bodies are provided at the central portion and both ends. The thickness of the front elastic bodies at both ends is thinner than the thickness of the front elastic body at the central portion.

If a display panel is warped due to a change in a use environment, the display panel undergoes a great displacement at both ends in the longitudinal direction and in the vicinity of the ends. With the display device described in Japanese Unexamined Patent Application Publication No. 2014-186317, when the display panel is warped, a pressing force given to the display panel from the front elastic bodies at the both ends is smaller than a pressing force given to the display panel from the front elastic bodies at the central portion. This can restrain an excessive pressing force from being exerted from the front elastic bodies to both ends of the display panel due to the warp. Therefore, display unevenness is less likely to occur at both ends.

With the display device described in Japanese Unexamined Patent Application Publication No. 2016-139126, a frame is provided in front of a display panel, front elastic bodies are provided between the frame and a front surface formed by the four edges of the display panel, and back elastic bodies are provided between a panel holder and the back surface of the display panel. Panel support portions are formed integrally with the panel holder. Part of the bottom end of the display panel is supported from below by the panel support portions. In a first embodiment, a single back elastic body is continuously provided across each of the right edge, left edge, and upper edge, but across the bottom edge of the display panel supported by the panel support portions, back elastic bodies are provided so as to be spaced without being continuous.

With the display device in Japanese Unexamined Patent Application Publication No. 2016-139126, if the display panel is warped due to a change in the use environment, a holding force is exerted on the display panel as an elastic force from the front elastic bodies and back elastic bodies. The force exerted on the display panel from the front elastic bodies and back elastic bodies is smaller in the vicinity of the panel support portions than in other portions. This restrains excessive stress concentration on the display panel in the vicinity of the panel support portions. Therefore, the display panel is less likely to undergo a local deformation and display unevenness is suppressed.

The display devices described in Japanese Unexamined Patent Application Publication Nos. 2014-186317 and 2016-139126 have elastic bodies between the display panel and the frame that supports the periphery of the display panel. If the display panel is warped, the elastic bodies are deformed to prevent a great pressing force from being exerted on the display panel. This suppresses display unevenness caused on the display panel due to the deformation.

With recent display devices, part of a front panel fixed in front of a display panel is used as an operation portion. In general, an operation detection unit, which is, for example, of capacitive type, is provided in the operation portion. When a finger touches this operation portion, the operation detection unit detects that a finger has touched the operation portion. If the front panel is pressed by the force of the finger when the finger touches the operation portion, strain may be exerted on the front panel. When this strain is transmitted to the display panel, display unevenness may be locally generated on a display screen. With conventional display devices described in Japanese Unexamined Patent Application Publication Nos. 2014-186317 and 2016-139126 and the like, however, a technical means that suppresses display unevenness caused by this operation is not described.

SUMMARY

Accordingly, it is an object of the present disclosure to provide a display device that restricts strain exerted on a front panel fixed in front of a display panel so that display unevenness can be suppressed, the strain being caused when a finger touches the front panel to operate it and pressure by the finger is exerted on the front panel.

A display device in the present disclosure includes: a front panel, which is translucent and at least part of which is an operation portion; a display panel fixed to the back surface of the front panel; a support member that supports the front panel from behind in a support area in which the display panel is not disposed; and an operation detection unit that detects that the operation portion has been operated. In the support area, an elastic member is interposed between the front panel and the support member. A pressure resistive portion is provided in part of the elastic member, the pressure resistive portion exerting, when the operation portion is pressed backward, a greater compressive resistance force on the operation portion than on the front panel excluding the operation portion.

With the display device in the present disclosure, when on the front panel an area in which the part of the elastic member acting as the pressure resistive portion is present and an area in which the elastic member excluding the part acting as the pressure resistive portion is present are pressed with the same force backward, the compressive resistance force exerted from the part of the elastic member acting as the pressure resistive portion to the front panel is greater than the compressive resistance force exerted from the elastic member excluding the part acting as the pressure resistive portion to the front panel.

With the display device in the present disclosure, a portion of the elastic member being the closest to the operation portion in a plane orthogonal to the front-back direction may be the pressure resistive portion, for example. Alternatively, a portion of the elastic member overlapping the operation portion from behind may be the pressure resistive portion.

With the display device in the present disclosure, the front panel has a display area to which the display panel is fixed and an extension portion extending from the display area, the extension portion being supported by the support member in the support area; and the operation portion may be provided in the extension portion.

Alternatively, with the display device in the present disclosure, the front panel has a display area to which the display panel is fixed and an extension portion extending from the display area, the extension portion being supported by the support member in the support area; and the operation portion may be provided in the display area.

Alternatively, with the display device in the present disclosure, the front panel has a display area to which the display panel is fixed and an extension portion extending from the display area, the extension portion being supported by the support member in the support area; and the operation portion may be provided in the extension portion and the pressure resistive portion may be disposed at a position at which the pressure resistive portion encloses the operation portion from at least three directions.

With the display device in the present disclosure, the distance between the front panel and the support member that interpose the part of the elastic member acting as the pressure resistive portion is less than the distance between the front panel and the support member that interpose the elastic member excluding the part acting as the pressure resistive portion.

Alternatively, with the display device in the present disclosure, the part of the elastic member acting as the pressure resistive portion has a higher compressive elastic modulus in a direction in which the front panel and the support member come close to each other than the elastic member excluding the part acting as the pressure resistive portion.

Alternatively, with the display device in the present disclosure, the part of the elastic member acting as the pressure resistive portion has a higher compression ratio in thickness in a direction in which the front panel and the support member are opposite to each other than the elastic member excluding the part acting as the pressure resistive portion.

With the display device in the present disclosure, a front panel is supported by a support member in a support area in which a display panel is not fixed, with an elastic member intervening between the front panel and the support member. A portion of the elastic member being the closest to an operation portion or overlapping it acts as a pressure resistive portion. In an area in which the portion of the elastic member acting as the pressure resistive portion is disposed, the distance between the front panel and the support member is less than in the remaining area on the support member. Alternatively, the portion of the elastic member acting as the pressure resistive portion has a higher compressive elastic modulus than the remaining portion of the elastic member. Alternatively, the portion of the elastic member acting as the pressure resistive portion has a higher compression ratio in thickness than the remaining portion of the elastic member.

Therefore, even if the front panel is deformed because a finger touches the operation portion and the front panel is locally pressed with the finger, the deformation of the front panel is suppressed due to the presence of the pressure resistive portion, making the display panel less likely to be affected by the deformation of the front panel. Accordingly, it is possible to suppress display unevenness caused when the operation portion is operated with a finger.

DETAILED DESCRIPTION OF THE PREFERRED EMBODIMENTS

FIGS. 1 to 4 illustrate a display device 1 in a first embodiment of the present invention. This display device 1, which is intended to be mounted in a vehicle, is disposed in, for example, an opening formed in a center console in the interior of a vehicle. The display device 1 displays information about operations of an audio device as well as a navigation device or any of various other devices involved in the travel of the vehicle. The display device 1 is also employed as a device for use in the operation of these devices.

Figure 2:
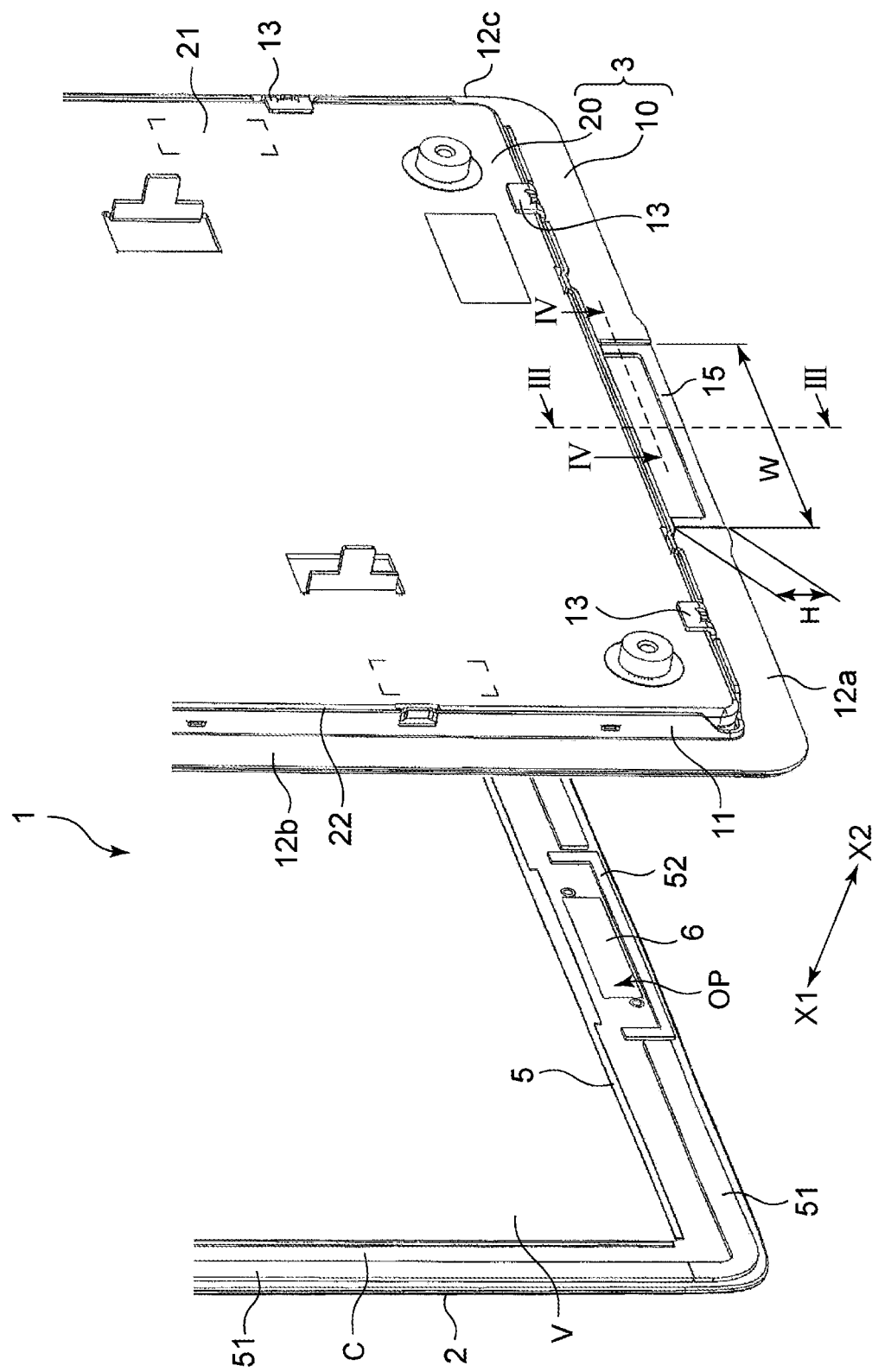
FIG. 2 is an exploded perspective view of part of the display device in FIG. 1.
Figure 3:
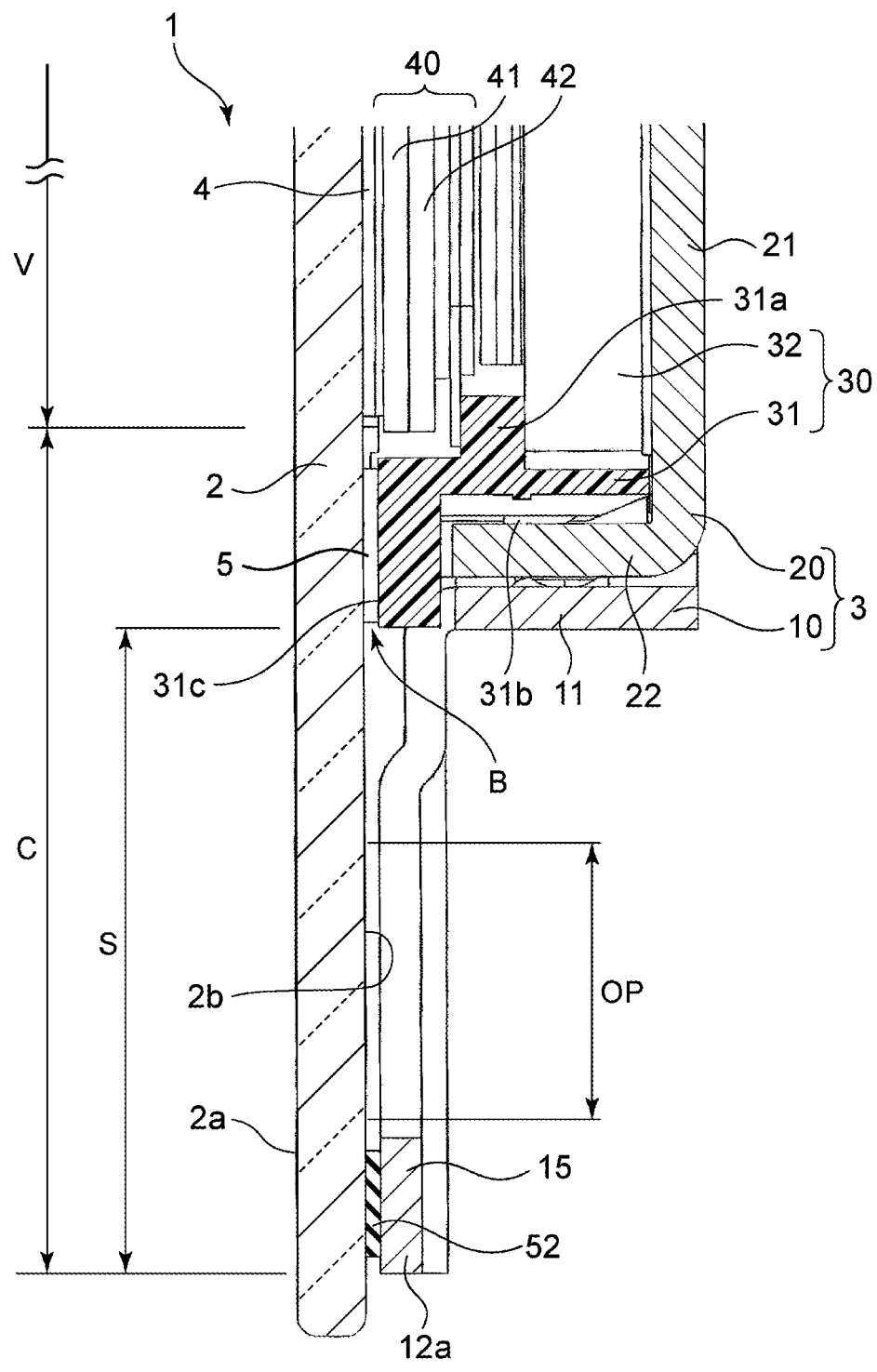
FIG. 3 is a cross-sectional view of the display device in FIGS. 1 and 2 as taken along line III-III.

As illustrated in FIGS. 2 and 3, the display device 1 has a front panel 2 on the front side (in the X1 direction) and also has a housing 3 on the back side (in the X2 direction). The housing 3 has an outer support member 10 and an inner support member 20. The outer support member 10 and inner support member 20 are formed from a metal sheet. With the display device 1, the inner support member 20 is fixed to, for example, part of the body of the vehicle in its interior.

As illustrated in FIG. 2, the outer support member 10 has a support frame 11 that encloses the four edges of the inner support member 20. A lower support plate 12a, a right support plate 12b, a left support plate 12c, and an upper support plate (not illustrated in FIG. 2) are formed so as to be bent from the ends of the support frame 11 on the front side (in the X1 direction) and then integrally extend downward, rightward, leftward, and upward, respectively. The front surfaces of the lower support plate 12a, right support plate 12b, left support plate 12c, and upper support plate, the front surfaces being oriented toward the front sides (in the X1 direction), are positioned on the same plane.

As illustrated in FIGS. 2 and 3, the inner support member 20 integrally has a backward bottom plate 21 positioned on the back side (in the X2 direction) and side plates 22 bent from the upper, lower, left, and right edges of the backward bottom plate 21 toward the front side (in the X1 direction). As illustrated in FIG. 2, the outer support member 10 integrally has a plurality of engaging pieces 13 bent from the back ends of the lower support plate 12a, right support plate12b, left support plate 12c, and upper support plate. Each engaging piece 13 and the inner support member 20 are recess-projection fitted together through engaging claws, fixing the outer support member 10 and inner support member 20 to each other.

As illustrated in FIG. 3, a backlight 30 is stored on the back side (on the X2 direction side) in the interior of the inner support member 20. The backlight 30 has a unit holder 31 and a light unit 32 held in the unit holder 31. The unit holder 31 is injection-molded from a synthesis resin material or is die-cast from a light metal material. The unit holder 31 is shaped like a quadrangular frame. A support rib 31a is integrally formed on an inner surface at each edge of the unit holder 31. A side front surface facing the front side (in the X1 direction) of the light unit 32 contacts the support ribs 31a, fixing the light unit 32 to the unit holder 31. An engaging pawl 31b is integrally formed on a side outer surface at each edge of the unit holder 31. This engaging pawl 31b and an engaging hole open in the side plate 22 of the inner support member 20 are recess-projection fitted together, fixing the backlight 30 to the inner support member 20.

The light unit 32 is constituted by a combination of a light guide body formed from a transparent plastic material, a light-emitting diode (LED) light source that emits light to the light guide body, a reflection member that transmits light propagating in the light guide body to the front side (in the X1 direction), a lens member, and the like.

The front panel 2 is a glass plate or a transparent synthetic resin plate. The front panel 2 has a front surface 2a facing toward the front side (in the X1 direction) and a back surface 2b facing toward the back side (in the X2 direction). As illustrated in FIG. 3, a display panel 40 is fixed to the back surface 2b of the front panel 2. The back surface 2b of the front panel 2 and the front surface of the display panel 40 are fixed to each other by being bonded with a transparent adhesive layer 4 such as an optical clear adhesive (OCA). The display panel 40 is fixed directly to the front panel 2, and the display panel 40 and backlight 30 are not fixed to each other. That is, there is a clearance between the display panel 40 and the light unit 32 behind it. The display panel 40 and unit holder 31 may be brought into contact with each other, but are not fixed to each other.

The display panel 40 is a transmission-type color liquid crystal display panel in an in-plane switching (IPS) driving method, in which a display screen is made relatively wide. The display panel 40 has a pair of glass substrates 41 and 42, a liquid crystal layer interposed between the glass substrates 41 and 42, a polarizing plate, and the like.

As illustrated in FIG. 3, a front surface 31c of the unit holder 31, which is part of the backlight 30, the front surface 31c facing toward the front side (in the X1 direction), is positioned so as to enclose the outer side of the four edges of the display panel 40. The back surface 2b of the front panel 2 and the front surface 31c of the unit holder 31 are fixed to each other with an adhesive layer 5. An example of the adhesive layer 5 is a double-faced adhesive tape.

Figure 1:
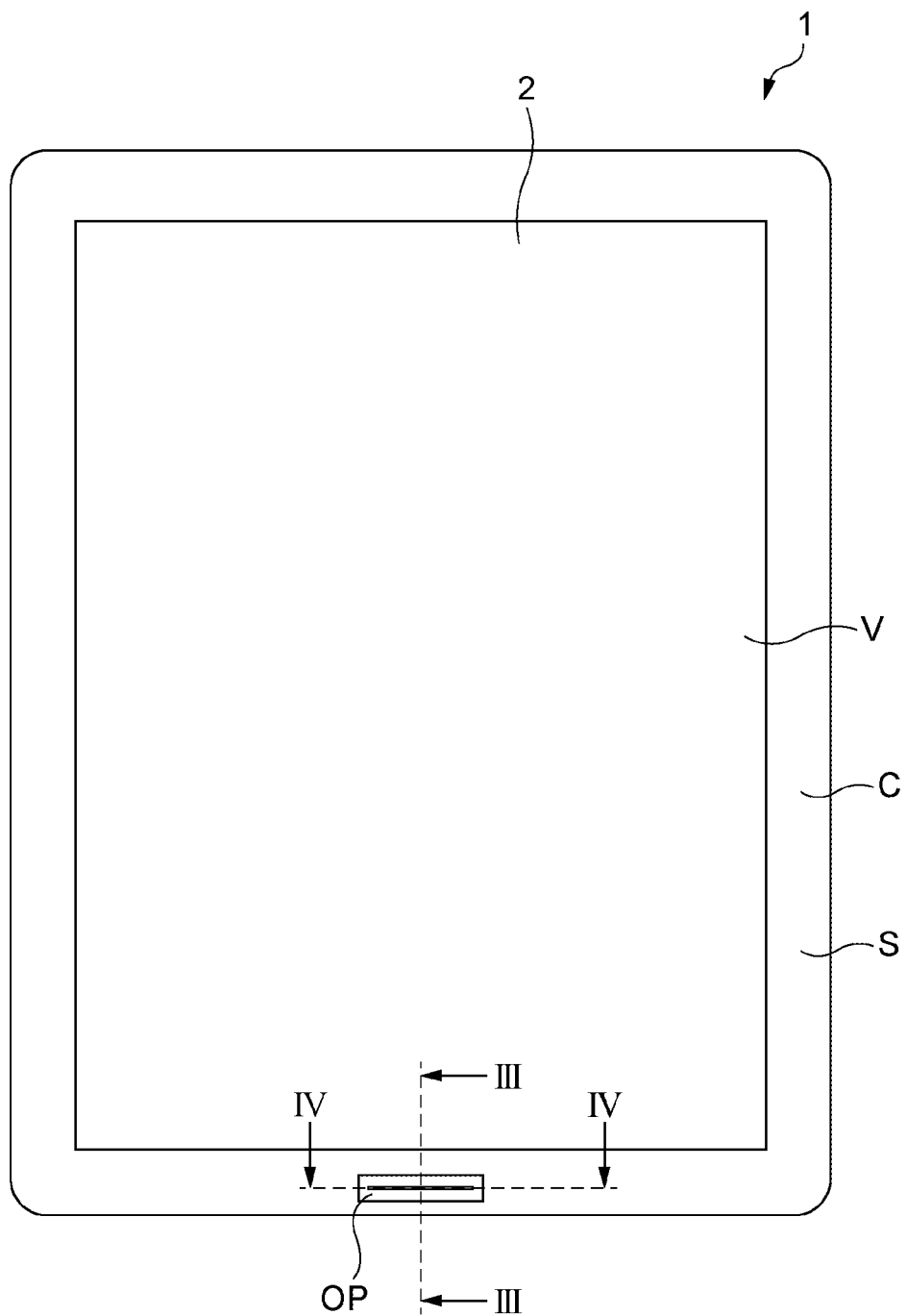
FIG. 1 is a front view of a display device in a first embodiment of the present invention when viewed from the front side.

As illustrated in FIGS. 1 and 3, when the front panel 2 is viewed from the front side toward the back side (in the X2 direction), an area in which the display screen of the display panel 40 is present is an image display area V. On the front panel 2, extension portions are provided so as to extend from the image display area V upward, downward, leftward, and rightward. These extension portions form a decorated area (or colored area) C that surrounds the image display area V from the four directions. Since the image display area V on the front panel 2 is transparent, an image displayed on the display panel 40 positioned behind the image display area V passes through the image display area V and can thereby be viewed. In the decorated area C, an opaque colored layer is provided on the back surface 2b of the front panel 2. When the decorated area C is viewed from the front side, a structure positioned behind the front panel 2 (in the X2 direction) is covered by the colored layer and cannot thereby be viewed. The adhesive layer 5 with which the back surface 2b of the front panel 2 and the front surface 31c of the unit holder 31 are bonded to each other is covered by the decorated area C and cannot thereby be viewed from the front side.

As illustrated in FIG. 3, part of the extension portions extending from the image display area V on the front panel 2, that is, part of the decorated area C, is opposite to the lower support plate 12a, right support plate12b, left support plate 12c, and upper support plate, which are included in the outer support member 10. The portions opposite to these support plates form a support area S. The support area S, in which the display panel 40 is not disposed, is present in an area that surrounds the display panel 40 from the four directions.

As illustrated in FIGS. 1 and 2, an operation portion OP is provided on the front panel 2. Specifically, the operation portion OP is provided in the extension portion extending downward from the image display area V on the front panel 2. More specifically, the operation portion OP is provided in the support area S in the lower portion of the decorated area C. In the decorated area C, a colored layer in a deep color such as black or dark green is provided on the back surface 2b of the front panel 2. By contrast, in the operation portion OP, another colored layer 6, which is colored in white or a metallic color so as to be easily identified, is formed between the back surface 2b of the front panel 2 and the colored layer in a deep color. When the front panel 2 is viewed from the front side, therefore, the operation portion OP can be noticeably viewed in the decorated area C.

On the back surface 2b of the front panel 2, a touch sensor is provided as an operation detection unit in an area in which at last the operation portion OP is provided. The touch sensor is a capacitive sensor. When on the front surface 2a of the front panel 2 a finger comes into contact with a portion opposing the operation portion OP, the capacitive sensor detects a change in capacitance. Then, an operation signal is obtained. A resistive sensor may be placed on the front surface 2a of the front panel 2 as the operation detection unit that detects that the operation portion OP has been operated. In this resistive sensor, two transparent substrates are spaced so as to oppose each other, a transparent resistive film being formed on the opposing surface of each substrate. When the resistive sensor is pressed with a finger, a contact between the resistive films is detected. Alternatively, a force sensor may be provided between the back surface 2b of the front panel 2 and the lower support plate 12a of the outer support member 10 as the operation detection unit so that when the operation portion OP is pressed, a slight warp caused in the front panel 2 is detected.

As illustrated in FIG. 2, first elastic members 51 are interposed between the upward, downward, leftward, and rightward extension portions of the front panel 2 and the lower support plate 12a, the right support plate12b, the left support plate 12c, and upper support plate of the outer support member 10. The first elastic members 51 are fixed by being bonded to both the front panel 2 and the lower support plate 12a, right support plate 12b and left support plate 12c. A second elastic member 52 is also provided together with the first elastic member 51 between the downward extension portion of the front panel 2 and the lower support plate 12a of the outer support member 10. The second elastic member 52 is also fixed by being bonded to both the front panel 2 and the lower support plate 12a. The first elastic member 51 and second elastic member 52 are formed from rubber, formed rubber, formed resin, or the like. When the front panel 2 and outer support member 10 undergo compressive deformation in a direction in which they come close to each other, that is, in their thickness direction in the front-back direction (X1-X2 direction), the first elastic member 51 and second elastic member 52 can be elastically restored with a predetermined compressive elastic modulus.

Figure 4:
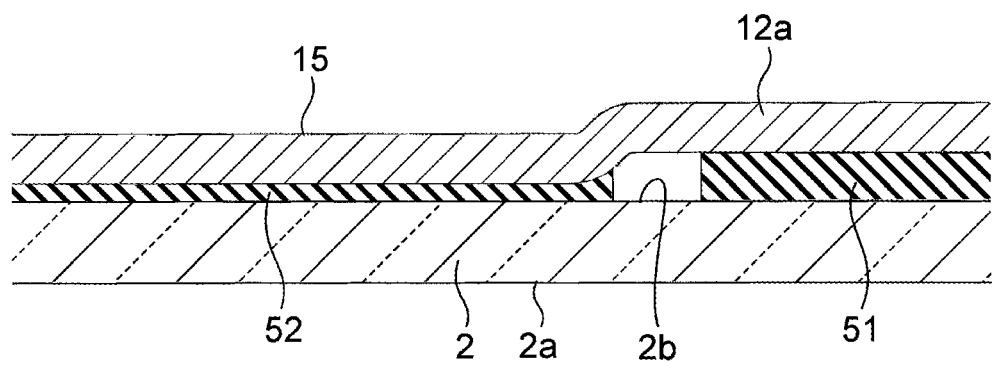
FIG. 4 is a cross-sectional view of the display device in FIGS. 1 and 2 as taken along line IV-IV.

As illustrated in FIGS. 2 and 4, part of the lower support plate 12a of the outer support member 10, the part being an area having a width of W and a height of H, is an elastic member pressing area 15. In the elastic member pressing area 15, the distance between the front panel 2 and the lower support plate 12a, which are disposed so as to be opposite to each other, in the front-back direction is less than in the remaining area on the lower support plate 12a.

As illustrated in FIGS. 2 and 3, in the downward extension portion of the front panel 2, the second elastic member 52 is disposed at a position at which the second elastic member 52 is opposite to the elastic member pressing area 15. The first elastic member 51 and second elastic member 52 are formed from the same elastic material and have the same thickness in the front-back direction (X1-X2 direction) in a free state in which the first elastic member 51 and second elastic member 52 are not attached to the display device 1. As also illustrated in the cross-sectional view in FIG. 4, in the elastic member pressing area 15, a spacing by which the front panel 2 and lower support plate 12a are separated in the front-back direction (X1-X2 direction) so as to be opposite to each other is less than in the remaining portion in the support area S. Therefore, the second elastic member 52 has a higher compression ratio in thickness in the front-back direction (X1-X2 direction) than the first elastic member 51, so the second elastic member 52 acts as a pressure resistive portion. When the thickness of each elastic member in the front-back direction in the free state is T0 and the thickness of the elastic member in the front-back direction in a state in which the elastic member is interposed between the outer support member 10 and the extension portions of the front panel 2 is T1, the compression ratio of the thickness is (T0-T0/T0.

As illustrated in FIG. 2, among the first elastic members 51 and second elastic member 52, the second elastic member 52 at the position closest to the operation portion OP in a plane orthogonal to the front-back direction (X1-X2 direction) is the pressure resistive portion. The second elastic member 52 acting as a pressure resistive portion is disposed at the position closest to the operation portion OP in three directions, leftward direction, rightward direction and downward direction. That is, the pressure resistive portion is disposed so as to surround the operation portion OP from the three directions in a plane orthogonal to the front-back direction (X1-X2 direction). The second elastic member 52 acting as a pressure resistive portion may be disposed so as to surround the operation portion OP from all directions, upward direction, downward direction, leftward direction and rightward direction.

It will be assumed that on the front panel 2, a portion in which the second elastic member 52 acting as a pressure resistive portion is present and a portion in which the first elastic members 51, which do not act as a pressure resistive portion, is present are pressed backward (in the X2 direction) with the same force. Then, a compressive resistance force exerted toward the front side (in the X1 direction) from the second elastic member 52 to the front panel 2 is greater than a compressive resistance force exerted toward the front side from the first elastic member 51 to the front panel 2. That is, the second elastic member 52, which is part of the elastic members, is a pressure resistive portion that exerts, when the operation portion OP is pressed backward, a greater compressive resistance force on the operation portion OP than on the front panel 2 excluding the operation portion OP. When on the front panel 2 a portion in which the second elastic member 52 acting as a pressure resistive portion is present and a portion in which the first elastic members 51, which do not act as a pressure resistive portion, is present are pressed with the same force in the backward direction (X2 direction) as described above, an amount by which the front panel 2 is displaced backward (in the X2 direction) in a portion in which the second elastic member 52 is disposed is smaller than an amount by which the front panel 2 is displaced backward in a portion in which the first elastic member 51 is disposed.

Although, in the first embodiment, the first elastic members 51 and second elastic member 52 are separately provided as illustrated in FIG. 2, the first elastic members 51 and second elastic member 52 may be integrally formed together from the same elastic material so as to be continuous. In this case, a portion, on the continuous elastic member, pressed by the elastic member pressing area 15 acts as a pressure resistive portion.

In the free state, the thickness of the second elastic member 52 in the front-back direction (X1-X2 direction) may be greater than the thickness of the first elastic member 51 in the front-back direction. Alternatively, elastic materials may be selected so that the second elastic member 52 has a greater compressive elastic modulus in the front-back direction than the first elastic member 51. The compressive elastic modulus is represented as σ/τ, where τ is the compression strain of the elastic member in the front-back direction and σ is the stress of the elastic member in the compression direction.

Next, effects of the display device 1 in the first embodiment will be described.

With the display device 1, the first elastic members 51 and second elastic member 52 are interposed between the lower support plate 12a, right support plate12b, left support plate 12c, and upper support plate, which are included in the outer support member 10, and the extension portions of the front panel 2 extending upward, downward, leftward, and rightward. Since the display device 1 is intended to be mounted in a vehicle or the like, the size of the image display area V is larger when compared with mobile devices and the area of the front panel 2 is relatively large. The front panel 2 is supported by the outer support member 10 with the first elastic members 51 and second elastic member 52 intervening between the front panel 2 and the outer support member 10. Therefore, even if the front panel 2 having a large area is warped or the outer support member 10 is deformed due to tolerance, the warp or deformation is eliminated by the deformation of the first elastic members 51 and second elastic member 52, preventing a great strain from being exerted on the front panel 2 from the support area S. This restrains display unevenness caused by the support force of the support area S from appearing on the display screen of the display panel 40 fixed to the front panel 2.

As illustrated in FIG. 1, the operation portion OP is positioned at the bottom of the decorated area C outside the image display area V of the front panel 2. This operation portion OP is used as, for example, a home button. When the operation portion OP functioning as a home button is operated with various types of information displayed on the display panel 40, the display screen returns to a home screen.

As illustrated in FIG. 3, the operation portion OP is provided in the downward extension portion of the front panel 2 positioned below the image display area V, in which the display panel 40 and backlight 30 are disposed. In the operation portion OP, when a finger touches the front surface 2a of the front panel 2, the capacitive sensor is placed in a detection state. When the user touches operation portion OP with a finger, however, the user often presses the front panel 2 with the finger. When the downward extension portion of the front panel 2 is pressed with the finger, the downward extension portion is warped toward the back side (in the X2 direction) with a bonded portion acting as a fulcrum B, the bonded portion being between the unit holder 31 and the front panel 2 as indicated in FIG. 3. Due to the warp, the whole of the front panel 2 is likely to be bent and strained. If the front panel 2 is bent and strained, the strain is transmitted directly to the display panel 40 fixed to the front panel 2. This makes display unevenness such as black unevenness likely to appear in a display on the image display area V.

With the display device 1 in the first embodiment, however, the second elastic member 52 closest to the operation portion OP is a pressure resistive portion that is compressed with a high ratio in the front-back direction in the elastic member pressing area 15 as illustrated in FIGS. 3 and 4. Since the elastic member closest to the operation portion OP is a pressure resistive portion, even if the front panel 2 is pressed in the operation portion OP, an amount by which the downward extension portion of the front panel 2 is displaced backward can be made smaller than an amount by which an area other than the pressure resistive portion is displaced when the area is pressed with the force with which the operation portion OP is pressed. Therefore, even if the operation portion OP is pressed with a finger, the bend and strain of the front panel 2 can be suppressed, an influence on the display panel 40 can be minimized, and display unevenness such as black unevenness can be suppressed.

With the display device 1, the second elastic member 52 acting as a pressure resistive portion is provided so as to surround the operation portion OP from three directions from the left side, right side, and bottom side of the operation portion OP as illustrated in FIG. 2. This further enhances the effect of suppressing the strain of the front panel 2, the strain being caused when the front panel 2 is pressed in the operation portion OP.

Figure 5:
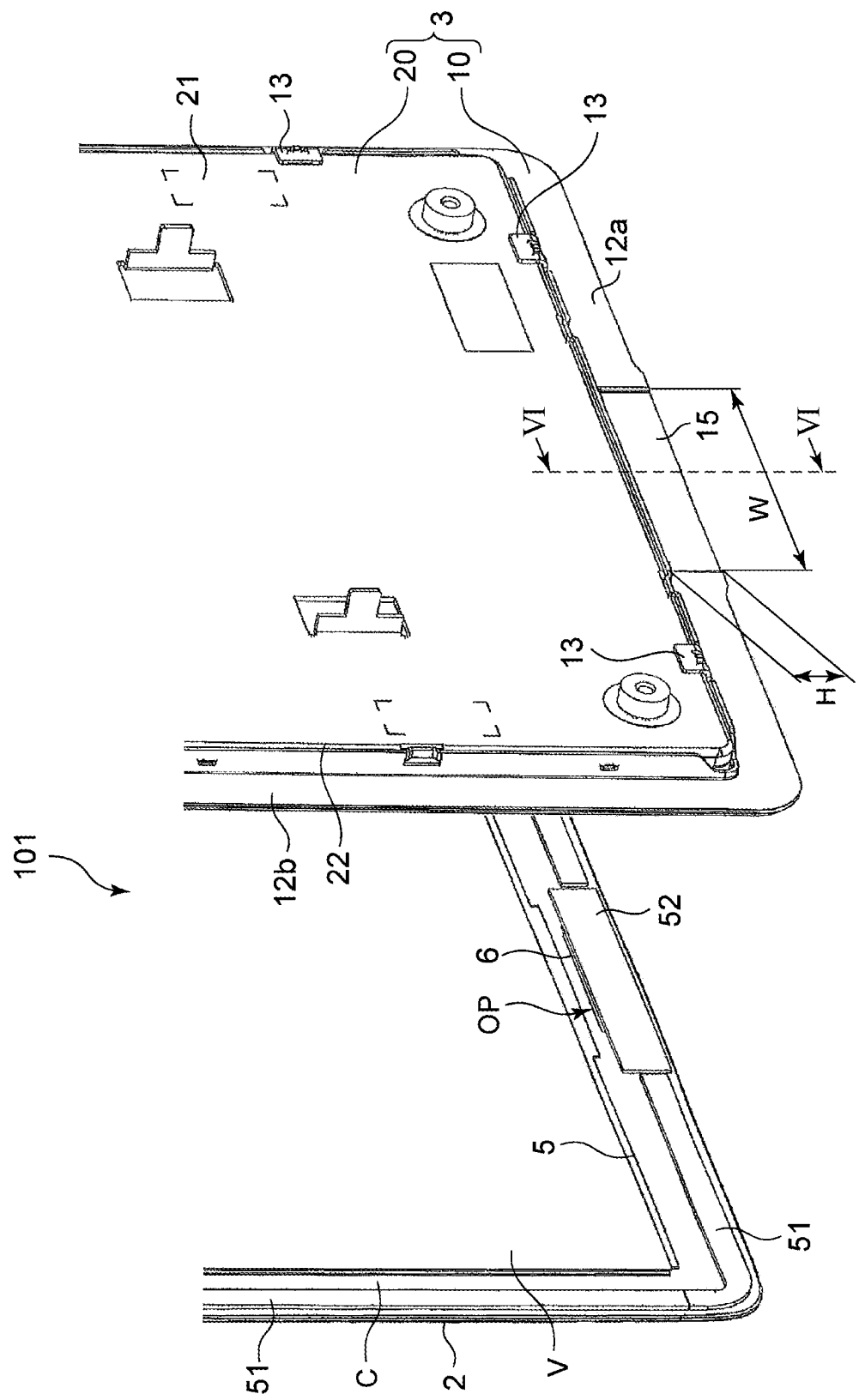
FIG. 5 is an exploded perspective view of a display device in a second embodiment of the present invention, the exploded perspective view being equivalent to FIG. 2.
Figure 6:
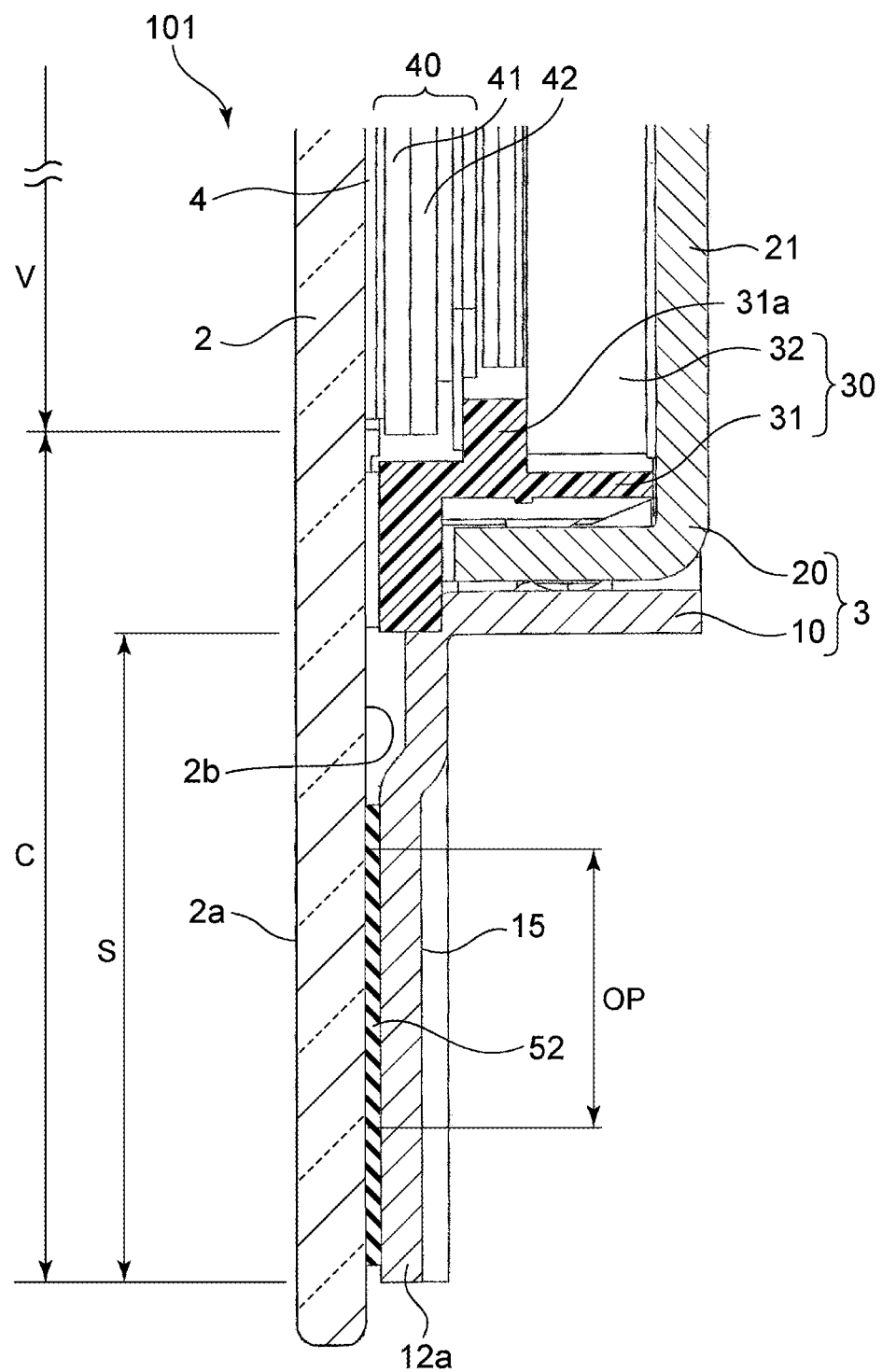
FIG. 6 is a cross-sectional view of the display device in the second embodiment in FIG. 5 as taken along line VI-VI.

FIGS. 5 and 6 illustrate a display device 101 in a second embodiment of the present invention.

With the display device 101, in the downward extension portion of the front panel 2, the operation portion OP is provided in the support area S in the decorated area C. However, the second elastic member 52 is provided so as to overlap the whole of the operation portion OP from the rear. Alternatively, the second elastic member 52 is provided so as to overlap at least part of the operation portion OP from the rear. On the lower support plate 12a of the outer support member 10, the elastic member pressing area 15 having a width of W and a height of H is partially deformed toward the front side (in the X1 direction). The whole of the second elastic member 52 is compressed in the front-back direction (X1-X2 direction) by this elastic member pressing area 15.

With this display device 101 as well, the second elastic member 52 is formed from the same elastic material as the first elastic member 51, and the first elastic member 51 and second elastic member 52 have the same thickness in the front-back direction (X1-X2 direction) in the free state. In the second embodiment as well, the first elastic member 51 and second elastic member 52 may be integrally formed together. The thickness of the second elastic member 52 in the front-back direction may be greater when compared with the first elastic member 51. Alternatively, the second elastic member 52 may have a greater compressive elastic modulus than the first elastic member 51.

With this display device 101, the second elastic member 52 positioned in the entire or almost all of the area behind the operation portion OP acts as a pressure resistive portion. Therefore, even if the downward extension portion of the front panel 2 is pressed backward in the operation portion OP, the forward compressive resistance force becomes great with respect to the force with which the downward extension portion is pressed. This makes the front panel 2 less likely to be bent and strained, and thereby makes the bend and strain less likely to affect the display panel 40.

Figure 7:
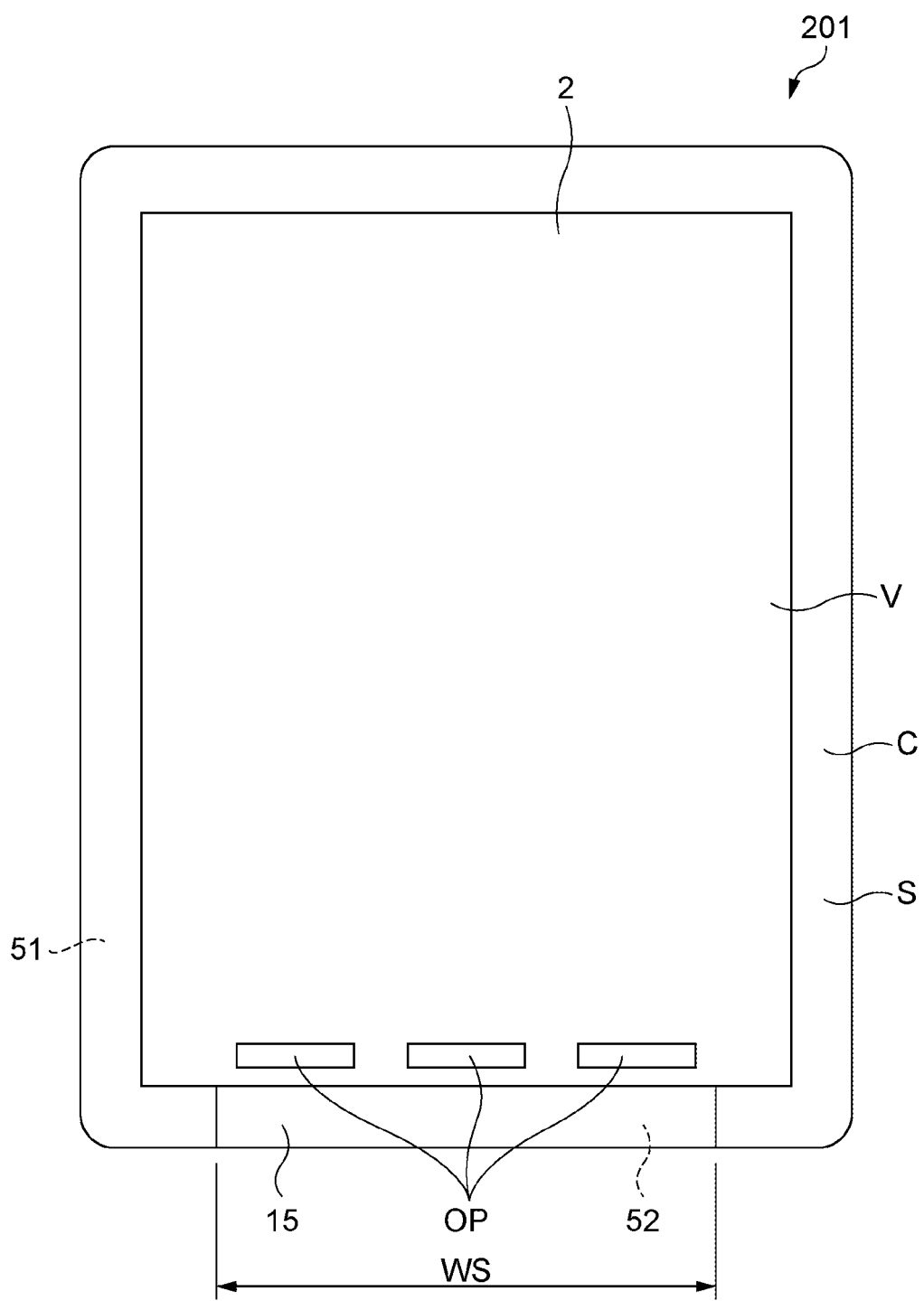
FIG. 7 is a front view of a display device in a third embodiment of the present invention when viewed from the front side.

FIG. 7 illustrates a display device 201 in a third embodiment of the present invention.

With this display device 201, the operation portion OP is provided in the image display area V. The operation portion OP is part of a display image created by the display panel 40. The operation portion OP is kept displayed by controlling an image displayed on the display panel 40, or is displayed only when a predetermined screen appears as necessary. In the third embodiment in FIG. 7, the operation portion OP is displayed at three places in the image display area V. Capacitive sensors are provided as operation detection units so as to be overlaid on the back surface 2b of the front panel 2. Therefore, when a finger of the operator touches the front surface 2a of the front panel 2 in any of the operation portions OP, the touch can be detected.

The basic structure of the display device 201 illustrated in FIG. 7 is the same as in the display device 1 in the first embodiment. Extension portions extended from the image display area V on the front panel 2 are the decorated area C. Part of this decorated area C is the support area S. In the support area S, the first elastic members 51 are interposed between extension portions of the front panel 2 and the lower support plate 12a, right support plate 12b, and left support plate 12c of the outer support member 10. In a range with a width of WS, the range being the closest to the three operation portions OP in the support area S, the second elastic member 52 is interposed between the lower support plate 12a and the downward extension portion of the front panel 2. In this range with the width WS, part of the lower support plate 12a of the outer support member 10 is deformed toward the front side, forming the elastic member pressing area 15. The second elastic member 52 positioned in the range with the width WS is compressed in the front-back direction with a ratio higher than a ratio with which the first elastic members 51 disposed in another area is compressed, as in the structure illustrated in FIG. 4. The elastic member at the position closest to the three operation portions OP is a pressure resistive portion.

With the display device 201 illustrated in FIG. 7, the operation portions OP are present within the image display area V. Therefore, when a finger touches the front surface 2a of the front panel 2 in any of the operation portions OP and then presses the front panel 2, strain generated on the front side panel 2 is likely to be transmitted directly to the display panel 40. With the display device 201, however, the second elastic member 52 acts as a pressure resistive portion in the area with the width WS, the area being the closest to the three operation portions OP. Since the strain generated on the front side panel 2 when any of the three operation portions OP is pressed with a finger can be minimized by the compressive resistance force of the pressure resistive portion, it possible to suppress display unevenness in a display image on the display panel 40 to a minimum.

Figure 8:
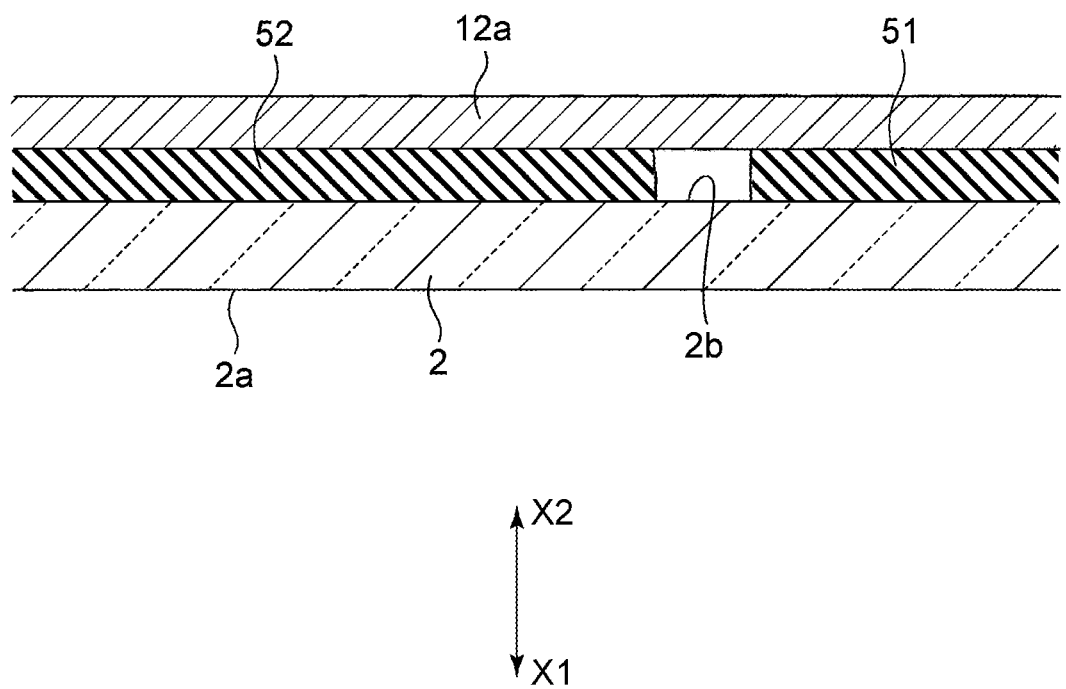
FIG. 8 is a cross-sectional view of a variation of a pressure resistive portion provided in the display device in the present invention, the cross-sectional view being equivalent to FIG. 4.

FIG. 8 illustrates a variation of the structure for using an elastic member as a pressure resistive portion.

With the display devices in the first to third embodiments, a pressure resistive portion is formed by making the distance between the front panel 2 and the lower support plate 12a of the outer support member 10 in the front-back direction less than in the remaining area on the lower support plate 12a as illustrated in FIG. 4 to increase the compression ratio of the second elastic member 52 in the front-back direction.

In the variation illustrated in FIG. 8, the distance between the front panel 2 and the lower support plate 12a, which are disposed so as to be opposite to each other, is the same in the front-back direction between the area in which the first elastic member 51 is disposed and the area in which the second elastic member 52 is disposed. However, elastic materials from which the elastic members are formed are selected so that the second elastic member 52 has a higher compressive elastic modulus in the front-back direction than the first elastic member 51. The first elastic member 51 and second elastic member 52 may have the same thickness in the front-back direction in the free state. Alternatively, in the free state, the thickness of the second elastic member 52 in the front-back direction may be greater than the thickness of first elastic member 51 in the front-back direction, and in the state in FIG. 8, the compression ratio of the second elastic member 52 in the front-back direction may be set so as to be higher than the compression ratio of the first elastic member 51 in the front-back direction.

When a pressure resistive portion formed from an elastic member having a high compressive elastic modulus is applied to any of the first to third embodiment, it is possible to restrain the front panel 2 from undergoing a great strain when the operation portion OP is pressed.

Furthermore, in the structure illustrated in FIG. 8, the first elastic member 51 and second elastic member 52 may be formed from equivalent elastic materials having the same compressive elastic modulus; in the free state, the thickness of the second elastic member 52 in the front-back direction may be greater than the thickness of the first elastic member 51 in the front-back direction; and in the state in FIG. 8, the compression ratio of the second elastic member 52 in the front-back direction may be set so as to be higher than the compression ratio of the first elastic member 51 in the front-back direction.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display device comprising:
a front panel, which is translucent and at least part of which is an operation portion;
a display panel fixed to a back surface of the front panel;
a support member that supports the front panel from behind in a support area in which the display panel is not disposed; and
an operation detection unit that detects that the operation portion has been operated; wherein
in the support area, an elastic member is interposed between the front panel and the support member, and
a pressure resistive portion is provided in part of the elastic member, the pressure resistive portion exerting, when the operation portion is pressed backward, a greater compressive resistance force on the operation portion than on the front panel excluding the operation portion.

2. The display device according to claim 1, wherein when on the front panel an area in which the part of the elastic member acting as the pressure resistive portion is present and an area in which the elastic member excluding the part acting as the pressure resistive portion is present are pressed with the same force backward, the compressive resistance force exerted from the part of the elastic member acting as the pressure resistive portion to the front panel is greater than the compressive resistance force exerted from the elastic member excluding the part acting as the pressure resistive portion to the front panel.

3. The display device according to claim 1, wherein a portion of the elastic member closest to the operation portion in a plane orthogonal to a front-back direction is the pressure resistive portion.

4. The display device according to claim 1, wherein a portion of the elastic member overlapping the operation portion from behind is the pressure resistive portion.

5. The display device according to claim 3, wherein:
the front panel has a display area to which the display panel is fixed and an extension portion extending from the display area, the extension portion being supported by the support member in the support area; and
the operation portion is provided in the display area.

6. The display device according to claim 3, wherein:
the front panel has a display area to which the display panel is fixed and an extension portion extending from the display area, the extension portion being supported by the support member in the support area; and
the operation portion is provided in the extension portion and the pressure resistive portion is disposed at a position at which the pressure resistive portion surrounds the operation portion from at least three directions.

7. The display device according to claim 1, wherein a distance between the front panel and the support member that interpose the part of the elastic member acting as the pressure resistive portion is less than a distance between the front panel and the support member that interpose the elastic member excluding the part acting as the pressure resistive portion.

8. The display device according to claim 1, wherein the part of the elastic member acting as the pressure resistive portion has a higher compressive elastic modulus in a direction in which the front panel and the support member come close to each other than the elastic member excluding the part acting as the pressure resistive portion.

9. The display device according to claim 1, wherein the part of the elastic member acting as the pressure resistive portion has a higher compression ratio in thickness in a direction in which the front panel and the support member are opposite to each other than the elastic member excluding the part acting as the pressure resistive portion.

10. A display device comprising:
- a front panel, which is translucent and at least part of which is an operation portion;
- a display panel fixed to a back surface of the front panel;
- a support member that supports the front panel from behind in a support area in which the display panel is not disposed; and
- an operation detection unit that detects that the operation portion has been operated; wherein
- in the support area, an elastic member is interposed between the front panel and the support member, and
- a pressure resistive portion is provided in part of the elastic member, the pressure resistive portion exerting, when the operation portion is pressed backward, a greater compressive resistance force on the operation portion than on the front panel excluding the operation portion;
- wherein the front panel has a display area to which the display panel is fixed and an extension portion extending from the display area, the extension portion being supported by the support member in the support area; and
- the operation portion is provided in the display area.

11. The display device according to claim 10, wherein when on the front panel an area in which the part of the elastic member acting as the pressure resistive portion is present and an area in which the elastic member excluding the part acting as the pressure resistive portion is present are pressed with the same force backward, the compressive resistance force exerted from the part of the elastic member acting as the pressure resistive portion to the front panel is greater than the compressive resistance force exerted from the elastic member excluding the part acting as the pressure resistive portion to the front panel.

12. The display device according to claim 10, wherein a portion of the elastic member closest to the operation portion in a plane orthogonal to a front-back direction is the pressure resistive portion.

13. The display device according to claim 10, wherein a portion of the elastic member overlapping the operation portion from behind is the pressure resistive portion.

14. The display device according to claim 10, wherein a distance between the front panel and the support member that interpose the part of the elastic member acting as the pressure resistive portion is less than a distance between the front panel and the support member that interpose the elastic member excluding the part acting as the pressure resistive portion.

15. The display device according to claim 10, wherein the part of the elastic member acting as the pressure resistive portion has a higher compressive elastic modulus in a direction in which the front panel and the support member come close to each other than the elastic member excluding the part acting as the pressure resistive portion.

16. The display device according to claim 10, wherein the part of the elastic member acting as the pressure resistive portion has a higher compression ratio in thickness in a direction in which the front panel and the support member are opposite to each other than the elastic member excluding the part acting as the pressure resistive portion.

17. A display device comprising:
- a front panel, at least part of which is an operation portion;
- a display panel fixed to a back surface of the front panel;
- a support member that supports the front panel from behind in a support area; and
- an operation detection unit that detects that the operation portion has been operated; wherein
- in the support area, an elastic member is interposed between the front panel and the support member, and
- a pressure resistive portion is provided in part of the elastic member, the pressure resistive portion exerting, when the operation portion is pressed backward, a greater compressive resistance force on the operation portion than on the front panel excluding the operation portion;
- wherein the front panel has a display area to which the display panel is fixed and an extension portion extending from the display area, the extension portion being supported by the support member in the support area; and
- the operation portion is provided in the extension portion.

18. The display device according to claim 17, wherein the compressive resistance force exerted from the part of the elastic member acting as the pressure resistive portion to the front panel is greater than the compressive resistance force exerted from the elastic member excluding the part acting as the pressure resistive portion to the front panel.

19. The display device according to claim 17, wherein a portion of the elastic member closest to the operation portion in a plane orthogonal to a front-back direction is the pressure resistive portion.

20. The display device according to claim 17, wherein a portion of the elastic member overlapping the operation portion from behind is the pressure resistive portion.

21. The display device according to claim 17, wherein the part of the elastic member acting as the pressure resistive portion has a higher compressive elastic modulus in a direction in which the front panel and the support member come close to each other than the elastic member excluding the part acting as the pressure resistive portion, or has a higher compression ratio in thickness in a direction in which the front panel and the support member are opposite to each other than the elastic member excluding the part acting as the pressure resistive portion.

\* \* \* \* \*